W. H. BANFIL.
HOSE CONNECTION.
APPLICATION FILED JAN. 14, 1916.
1,198,814.
Patented Sept. 19, 1916.
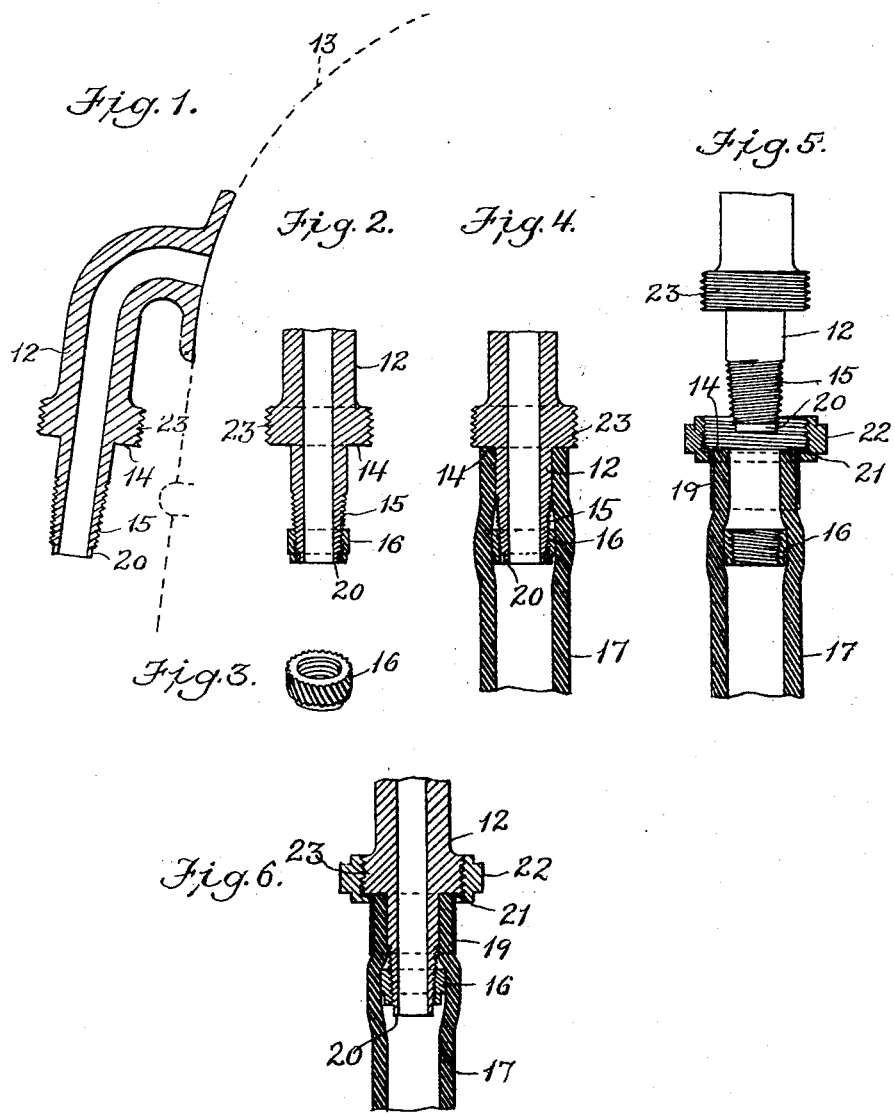
Inventor:
W. H. Banfil
Atty's.

UNITED STATES PATENT OFFICE.

WILLIAM H. BANFIL, OF BOSTON, MASSACHUSETTS.

HOSE CONNECTION.

1,198,814.　　　　Specification of Letters Patent.　　Patented Sept. 19, 1916.

Application filed January 14, 1916. Serial No. 72,052.

*To all whom it may concern:*

Be it known that I, WILLIAM H. BANFIL, a citizen of the United States, and resident of Boston, in the county of Suffolk and State of Massachusetts, have invented certain new and useful Improvements in Hose Connections, of which the following is a specification.

This invention has for its object to provide improved means for forming a fluid-tight connection between a portion of a conduit formed as a nipple, and a hose pipe, one end of which receives the nipple.

The invention as here shown is embodied in a nipple rigidly attached to the reservoir of a chemical fire-extinguisher, and a flexible hose through which gas and liquid under pressure are discharged when the extinguisher is in use. The invention may however be embodied in a nipple and a hose pipe connected therewith for other purposes.

The invention consists in the improvements which I will now proceed to describe and claim.

Of the accompanying drawings forming a part of this specification: Figure 1 represents a longitudinal section of a fire-extinguisher nipple forming a part of my improved hose connection; Fig. 2 represents a sectional view of the nipple, showing a nut engaged therewith; Fig. 3 represents a perspective view of the nut; Fig. 4 represents a sectional view of the nipple, showing the nut engaged therewith, the nipple and nut being inserted in a hose pipe; Fig. 5 represents the nipple in elevation and the hose pipe and nut in section, the nipple being removed from the pipe and nut, and the pipe being provided with a sleeve or ferrule; Fig. 6 represents in section the completed connection formed by the nipple, nut, hose and sleeve.

The same reference characters indicate the same or similar parts in all the views.

In the drawings: 12 represents a nipple formed, in this instance, for attachment to the reservoir 13 of a chemical fire-extinguisher, and constituting a part of the conduit through which the contents of the reservoir are discharged. The lower or outer portion of the nipple is reduced and provided at its outer end with a screw thread 15, an annular abutment shoulder 14 being provided, from which the threaded portion of the nipple projects.

16 represents a circular nut, the internal thread of which is formed to engage the nipple thread. The circular periphery of the nut is milled, as shown by Fig. 3, or otherwise roughened for a purpose hereinafter explained.

The hose pipe 17 is of elastic compressible material, such as rubber or a combination of rubber and fabric, and its normal internal diameter is less than the external diameter of the nut, so that the pipe is locally distended by the insertion of the nut therein. One end of the pipe 17 is formed to abut against the shoulder 14.

In forming a fluid-tight connection between the nipple 12 and hose pipe 17 I proceed as follows: The nut 16 is first screwed upon the nipple, as shown by Fig. 2, preferably until the outer ends of the nipple and nut are flush. The nipple and nut are then inserted in one end of the hose pipe 17, until the end of the pipe abuts against the shoulder 14, as shown by Fig. 4, force being exerted so that the nut locally distends the pipe, forming an expanded zone which is spaced from the abutting end of the pipe. The pipe and nut are next unscrewed from the nipple, as indicated by Fig. 5, leaving the nut in its original location in the pipe. The roughened periphery of the nut causes a coupling engagement between the nut and the pipe, so that the nut is obliged to turn with the pipe during the unscrewing operation. After the removal of the pipe and nut an independent thin metal sleeve or ferrule 19 is placed upon the unexpanded portion of the pipe 17 between the abutting end of said pipe and the zone expanded by the nut. The sleeve 19 is of smaller diameter than the shoulder 14, so that its upper end is adapted to abut against and be arrested by said shoulder. The length of said sleeve is such that when its upper end is flush with the abutting end of the pipe 17 and abuts against the shoulder 14, its lower end is in close proximity to said expanded zone and spaced from the upper end of the nut, as shown by Fig. 5. The pipe now carrying the sleeve and the nut is next re-applied to the nipple and rotated to reëngage the nut with the nipple, as shown by Fig. 6, this second engagement advancing the nut farther onto the nipple than the first engagement, as may be seen by comparing Figs. 2 and 4 with Fig. 6, so that the space between the lower end of the sleeve 19 and the upper end of the nut is reduced and said ends are caused to tightly bite and compress a narrow zone of the pipe, thus forming a fluid-tight joint. The roughened periphery of the nut again acts to cause the nut to turn with the pipe during the reengaging operation, the independent sleeve 19 also rotating freely with the pipe during said operation.

The screw thread is preferably removed from the lower end of the nipple to form a reduced portion 20 adapted to enter the nut without engaging the thread thereof and thus guide the external thread of the nipple into engagement with the internal thread of the nut without liability of stripping the threads.

The sleeve 19 may have a flange 21 formed to engage a flanged coupling nut 22, which in turn is formed to engage an external thread 23 on the nipple 12. The coupling nut and the thread 23 constitute supplemental securing means, preventing the rotation of the sleeve, the pipe and the nut on the nipple.

Having described my invention, I claim:

1. A hose connection comprising a nipple externally screw-threaded at its outer end portion and having an annular abutment shoulder from which the threaded portion of the nipple projects, a circular nut internally threaded to engage the nipple thread and having a roughened periphery, a hose pipe of elastic material formed to receive and be locally expanded by said nut, and having an end formed to abut against said shoulder, the nut being insertible in the pipe while engaged with the nipple and spaced from the shoulder thereof, its roughened periphery engaging the inner surface of the pipe so that the nut and pipe are coupled together by the insertion of the nut in the pipe, and are adapted to be unscrewed in unison from the nipple, the nut remaining in the pipe and spaced from the abutting end thereof, and an independent sleeve of smaller diameter than said shoulder, so that its upper end is adapted to abut against the shoulder, the sleeve being formed to embrace the unexpanded portion of the pipe between the nut and the abutting end of the pipe, and the length of the sleeve being such that its lower end forms a clamping member between which and the nut a zone of the pipe is clamped by the reëngagement of the nipple with the nut, the independent sleeve being rotatable with the pipe and nut, while the nipple and the shoulder remain stationary.

2. A hose connection comprising an externally screw-threaded nipple having an abutment shoulder, a circular nut internally threaded to engage the nipple thread, a hose pipe of elastic material formed to receive and be locally expanded by said nut, and having an end formed to abut against said shoulder, the nut being insertible in the pipe while engaged with the nipple and spaced from the shoulder thereof, and the pipe and nut being rotatable in unison to unscrew the nut from the nipple, leaving the nut within the pipe and spaced from the abutting end thereof, and an independent sleeve formed at its upper end to abut against said shoulder and to embrace and rotate with the unexpanded portion of the pipe between the nut and the abutting end of the pipe, the lower end of said sleeve forming a clamping member between which and the nut a zone of the pipe is clamped by the reëngagement of the nipple with the nut, the upper end of the sleeve being provided with a flange and the nipple with a coupling nut formed to engage said flange and prevent rotation of the sleeve, pipe, and nut.

In testimony whereof I have affixed my signature.

WILLIAM H. BANFIL.

Copies of this patent may be obtained for five cents each, by addressing the "Commissioner of Patents, Washington, D. C."